US011269915B2

(12) United States Patent
Lyakas et al.

(10) Patent No.: US 11,269,915 B2
(45) Date of Patent: Mar. 8, 2022

(54) MAINTAINING SHARDS IN KV STORE WITH DYNAMIC KEY RANGE

(71) Applicant: Zadara Storage, Inc., Irvine, CA (US)

(72) Inventors: Alex Lyakas, Haifa (IL); Shyam Kaushik V., Bangalore (IN)

(73) Assignee: Zadara Storage, Inc., Irvine, CA (US)

( * ) Notice: Subject to any disclaimer, the term of this patent is extended or adjusted under 35 U.S.C. 154(b) by 101 days.

(21) Appl. No.: 15/726,192

(22) Filed: Oct. 5, 2017

(65) Prior Publication Data

US 2019/0108267 A1 Apr. 11, 2019

(51) Int. Cl.
*G06F 16/00* (2019.01)
*G06F 16/27* (2019.01)
*G06F 16/22* (2019.01)
*G06F 9/46* (2006.01)

(52) U.S. Cl.
CPC .............. *G06F 16/27* (2019.01); *G06F 9/466* (2013.01); *G06F 16/221* (2019.01); *G06F 16/2246* (2019.01); *G06F 16/278* (2019.01)

(58) Field of Classification Search
CPC ...... G06F 16/27; G06F 16/221; G06F 16/278; G06F 9/466; G06F 16/2246
USPC ........................................................ 707/703
See application file for complete search history.

(56) References Cited

U.S. PATENT DOCUMENTS

| 6,298,478 B1 * | 10/2001 | Nally | G06F 9/466 717/170 |
| 6,457,065 B1 * | 9/2002 | Rich | G06F 9/466 719/328 |
| 6,792,432 B1 * | 9/2004 | Kodavalla | G06F 16/2308 |
| 7,809,759 B1 * | 10/2010 | Bruso | G06F 16/2246 707/797 |
| 7,941,401 B2 * | 5/2011 | Okamoto | G06F 16/256 707/636 |

(Continued)

OTHER PUBLICATIONS

Aguilera et al., "A Practical Scalable Distributed B-Tree," Proceedings of VLDB Endowment, vol. 1, No. 1, Aug. 1, 2008, pp. 598-609, XP055559644, New York, NY.

(Continued)

*Primary Examiner* — Shiow-Jy Fan

(57) ABSTRACT

A method is provided for a key-value (KV) store database management system (DBMS) to provide a KV store to an application. The method includes providing a first low-level KV store and a top-level KV store. The first low-level KV store includes a root node and leaf nodes. The top-level KV store includes a leaf node pointing to the first low-level KV store. The leaf node in the top-level KV store includes a minimum key in the first low-level KV store and a pointer to the root node of the first low-level KV store. The method further includes determining a key-value insertion to the KV store would increase a number of keys in the first low-level KV store over an upper threshold and, in response to said determining, creating a second low-level KV store. The method additionally includes determining if a total number of keys in the first low-level store and the second low-level store is less than a lower threshold from key-value deletions and, when the total number of keys in the first low-level store and the second low-level store is less than the lower threshold, merging the first and the second low-level stores.

28 Claims, 9 Drawing Sheets

(56) References Cited

U.S. PATENT DOCUMENTS

| | | | | |
|---|---|---|---|---|
| 8,924,365 | B2* | 12/2014 | Myers | G06F 16/2322 |
| | | | | 707/691 |
| 9,003,162 | B2* | 4/2015 | Lomet | G06F 12/10 |
| | | | | 711/206 |
| 9,235,611 | B1* | 1/2016 | Murray | G06F 16/278 |
| 9,330,158 | B1* | 5/2016 | Xiao | G06F 16/278 |
| 9,330,271 | B1* | 5/2016 | Shams | G06F 21/606 |
| 9,471,657 | B1* | 10/2016 | Xiao | G06F 16/27 |
| 2004/0122837 | A1* | 6/2004 | Lee | G06F 16/2246 |
| 2011/0246503 | A1* | 10/2011 | Bender | G06F 16/258 |
| | | | | 707/769 |
| 2012/0047181 | A1* | 2/2012 | Baudel | G06F 16/322 |
| | | | | 707/797 |
| 2012/0254175 | A1 | 10/2012 | Horowitz et al. | |
| 2013/0110767 | A1* | 5/2013 | Tatemura | G06F 16/2379 |
| | | | | 707/607 |
| 2013/0275656 | A1* | 10/2013 | Talagala | G06F 12/0246 |
| | | | | 711/103 |
| 2013/0318126 | A1* | 11/2013 | Graefe | G06F 16/2246 |
| | | | | 707/797 |
| 2016/0085839 | A1 | 3/2016 | D'Halluin et al. | |
| 2017/0091327 | A1* | 3/2017 | Bostic | G06F 16/258 |
| 2017/0109295 | A1* | 4/2017 | Lasperas | G06F 16/9014 |
| 2019/0065621 | A1* | 2/2019 | Boles | G06F 16/22 |

OTHER PUBLICATIONS

EPO as ISA for PCT/US2018/052545, "International Search Report and Written Opinion," dated Mar. 7, 2019, 12 pages.

Mitchell et al., "Balancing CPU and Network in the Cell Distributed B-Tree Store Balancing CPU and Network in the Cell Distributed B-Tree Store," Proceedings of the 2016 USENIX Annual Technical Conference, pp. 451-464, Jan. 1, 2016, Denver, CO.

Communication Pursuant to Article 94(3) EPC dated Nov. 12, 2021 From the European Patent Office Re. Application No. 18811956.4. (10 Pages).

Nguyen et al. "Forest of Distributed B+ Tree Based on Key-Value Store for Big-Set Problem", International Conference on Database Systems for Advanced Applications, DASFAA:268-282, XP55550485A, Apr. 12, 2016.

Wikipedia "B-Tree", Wikipedia: 1-13, XP055859193, Dec. 20, 2016.

* cited by examiner

MAINTAINING SHARDS IN KV STORE WITH DYNAMIC KEY RANGE

FIELD OF INVENTION

This invention relates to key-value stores, and more particularly to maintaining a number of shards in a key-value store with dynamic key range.

DESCRIPTION OF RELATED ART

A key-value (KV) store can be viewed as a simple database. Unlike a structured query language (SQL) database, which arranges its data into tables and columns, a KV store is just a collection of key-value pairs. A key can be anything, e.g., an integer or a string. The only requirement is that the KV store knows how to compare any two keys. A value can also be anything, and the KV store treats it as a binary large object (BLOB). The only requirement is that KV store knows the size of a value so it can store it on disk.

Typically a KV store operates by transactions. A new transaction is opened when an application wants to perform some modification on the KV store, such as inserting a new key. Later, additional changes can be made on behalf of this transaction. At some point, the KV store decides that the running transaction has accumulated enough changes. KV store then commits the running transaction so all modifications on behalf of it are persisted on disk. Now a new transaction can be opened. Each transaction has some kind of transaction ID, such as a monotonically increasing integer.

A transaction cannot commit while there are application threads still joined to it. Only once all application threads have detached from the transaction, it can start committing. Typically, an application thread is attached to a transaction for a very short time—only to perform the in-memory modifications to the KV store.

A KV store may be implemented as a B-tree (e.g., a B+ tree). A B-tree is a built of tree blocks layered in several levels. The tree blocks include leaf nodes and index nodes. Leaf nodes contain keys and values that the KV store manages. Index nodes contain pointers to lower-level tree blocks, which may be other index nodes or leaf nodes.

All the key-value pairs stored in a B-tree are sorted, typically in ascending order. This means that index and leaf nodes on the "left" parts of the tree carry lower keys than index and leaf nodes on the "right" parts of the tree. Within a leaf node, key-value pairs are also sorted by key. Index nodes have their children pointers also sorted by key.

Searching for a key-value pair in a B-tree starts from the root node, and then follows relevant index nodes to eventually reach the relevant leaf node, in which the required key and value might be located. Since each tree block is located on disk, every "jump" to a lower level requires reading the relevant tree block from disk.

B-tree typically has very few levels so it is very wide, i.e., each index node has a large number of child blocks. The result is that searching for a key traverses a very small number of tree blocks so the amount of disk reads needed to find a key is very small. The size of a tree block is typically few kilobytes (KBs), for example, 4 KB, 16 KB or 32 KB.

SUMMARY

In one or more examples of the present disclosure, a KV store is structured as several low-level stores (hereafter "sub-KV stores") and a top-level store (hereafter "root of sub-KV stores"). Each sub-KV store is responsible for a particular range of keys.

Each sub-KV store has its own running transaction. The root of sub-KV stores also has its own running transaction. The root of sub-KV stores tracks super-blocks of the sub-KV stores. A sub-KV store's super-block carries information to locate, parse, and validate the sub-KV store content on disk, such as the coordinate of the sub-KV store content on disk, the length of the content, the checksum of the content, and the transaction ID of the sub-KV store.

In the KV store, changes are accumulated against the sub-KV stores. A sub-KV store decides independently to commit changes when it has accumulated enough changes, thereby avoiding write amplification or other overheads in persisting changes cross the whole KV store.

From the application perspective, there is only one KV store. The application is not aware of the internal separation of key range into smaller ranges handled by the sub-KV stores.

In one or more examples of the present disclosure, the sub-KV stores are created and deleted dynamically as key-value pairs are inserted and removed from the KV store. When key-value insertion causes the number of keys maintained by a sub-KV store to exceed an upper threshold, the sub-KV store is split into two sub-KV stores with approximately half of the keys. When key-value deletion causes the total number of keys maintained by adjacent sub-KV stores to fall below a lower threshold, the adjacent sub-KV stores are merged into one sub-KV store. In some examples, the adjacent sub-KV stores are merged by taking the key-value pairs from one sub-KV store and merging them into the other sub-KV store and deleting the empty sub-KV store.

BRIEF DESCRIPTION OF THE DRAWINGS

Use of the same reference numbers in different figures indicates similar or identical elements.

DETAILED DESCRIPTION OF THE INVENTION

Assume X random keys are to be updated with new values in a KV store, it may happen that a leaf node A has many of its key-value pairs updated but a leaf node B has only one of its key-value pairs updated. Further assume that the KV store decides to commit the running transaction. As part of this transaction commit, all changed tree blocks (both leafs and index nodes) have to be written to disk. Thus, both leaf node A and leaf node B are to be written to disk because their contents have changed. However, writing leaf node B to disk is inefficient because it has only one key-value change but the whole leaf has to be written to disk. Writing leaf node A is more efficient because it carries more changed key-values than unchanged key-values.

Consider a large KV store carrying billions of key-value pairs being modified by application. It may happen that a transaction commit has to write a lot of changed leaf nodes to disk, but each changed leaf node has not changed much. Unfortunately, the result is that there could be a massive stream of writes to disk as part of the transaction commit. In can be desirable to be able to commit only a part of the KV store, the part that had accumulated "enough" changes. With the above-described model, this is not possible because a transaction must persist all the changed tree blocks to disk, regardless of the amount of changes in a particular tree block.

In one or more examples of the present disclosure, a KV store is structured as several low-level KV stores (hereafter "sub-KV stores") and a top-level KV store (hereafter "root of sub-KV stores"). Each sub-KV store is responsible for a particular range of keys and has its own running transaction. For example, the leftmost sub-KV store is responsible for keys from 0 to 9,999, the next sub-KV store is responsible for keys from 10,000 to 19,999, and so on. Such separation of key range into smaller ranges is called "sharding," and each sub-range and the corresponding sub-KV store are called a "shard."

The root of sub-KV stores also has its own running transaction. The root of sub-KV stores tracks the following information (super-block) about each sub-KV store.
1) The minimal key of the sub-KV store. This is what defines that range of keys that this sub-KV store is responsible for.
2) The last committed transaction for this sub-KV store.
3) The location of the root block of the sub-KV store on disk.

The super-block may include additional information as required by a particular implementation, such as checksum of the root block of the sub-KV store.

Figure 1:
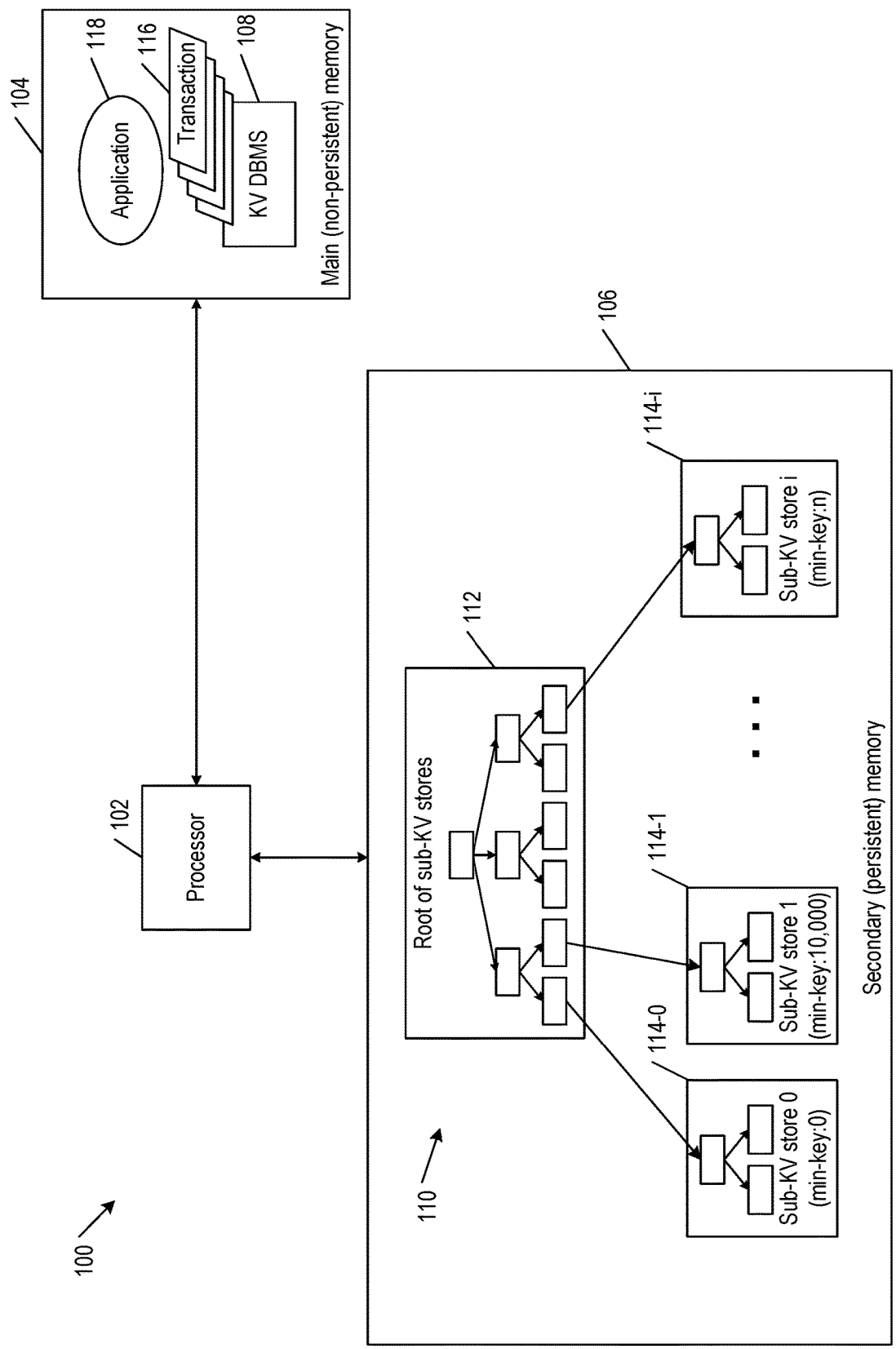
FIG. 1 is a storage system in some examples of the present disclosure.

FIG. 1 is a database system 100 in some examples of the present disclosure. System 100 includes a processor 102, a main (non-persistent) memory 104, and a secondary (persistent) memory 106.

Main memory 104 (e.g., random access memory) stores program instructions and data for a KV database management system (DBMS) 108 that manage a KV store 110 stored in secondary memory 106. KV store 110 encompasses a root of sub-KV stores 112 and a number of sub-KV stores, such as sub-KV stores 114-0, 114-1 . . . 104-i (collectively as "sub-KV stores 114" or as a generic individual "sub-KV store 114"). The root of sub-KV stores 112 and sub-KV stores 114 may be B-trees, red-black trees, AVL trees, or skip-list structures. In addition, sub-KV stores 114 may be a linked list or a simple sorted array. KV DBMS 108 tracks running transactions 116 for the root of sub-KV stores 112 and sub-KV stores 114. Note that "KV DBMS" and "KV store" are used interchangeably and they are often considered together as one entity. Optionally main memory 104 stores program instructions and data for an application 118 that accesses KV store 110. Alternatively application 118 may be located in another system connected by a network to storage system 100 to access KV store 110.

Secondary memory 106 (e.g., disk) stores data that form KV store 110, including data that form the root of sub-KV stores 112 and sub-KV stores 114. Alternatively the data that form the root of sub-KV stores 112 and sub-KV stores 114 may be located on different secondary memories. Processor 102, main memory 104, and secondary memory 106 may be a single server, or processor 102 and main memory 104 may be a server that accesses a secondary memory 106 that is a storage system, such as storage area network (SAN) or a network attached storage (NAS), over a network.

Figure 2:
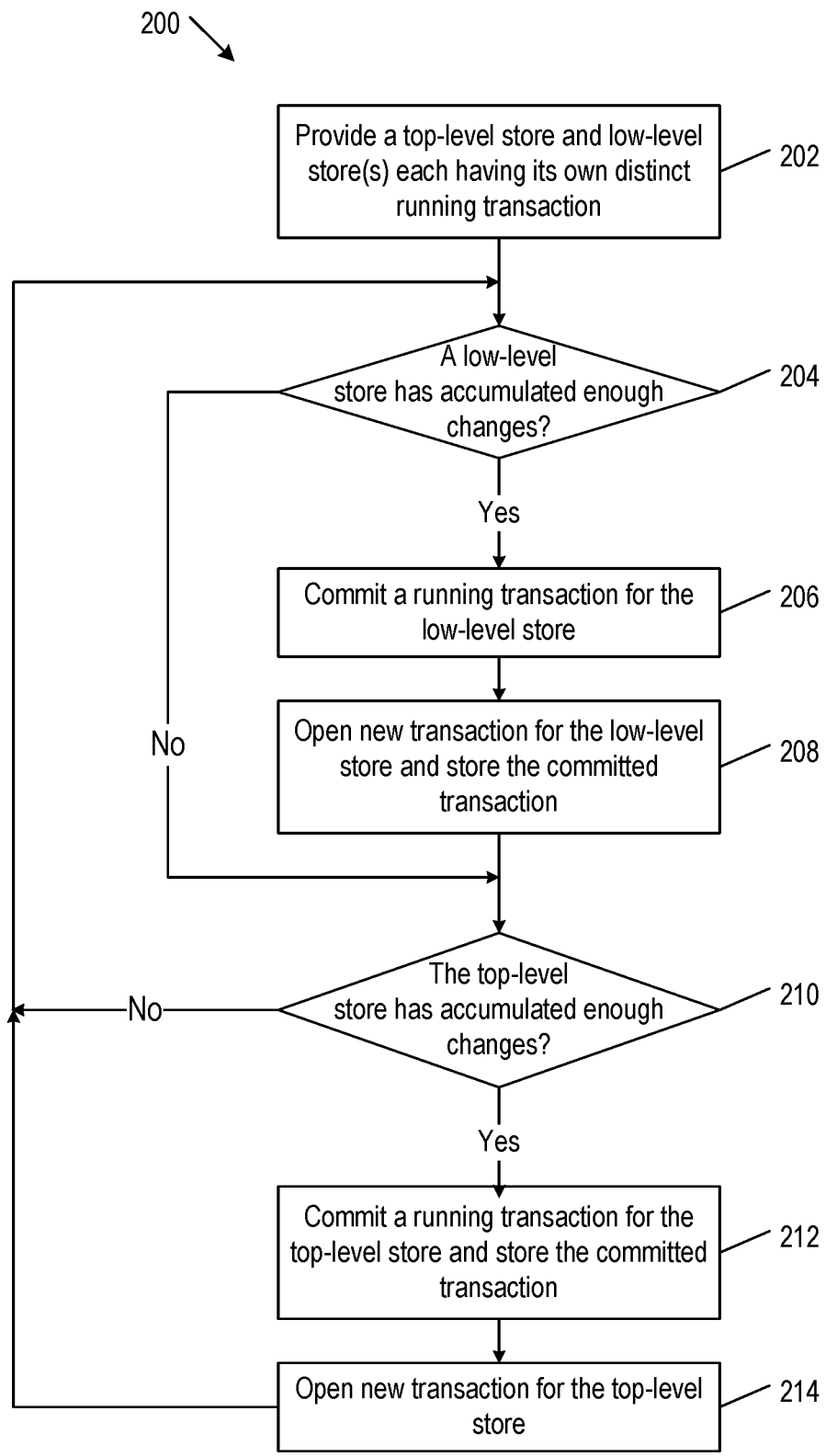
FIG. 2 is a flowchart of a method for a key-value (KV) database management system (DBMS) of FIG. 1 to provide a KV store to an application 118 in examples of the present disclosure.

FIG. 2 is a flowchart of a method 200 for KV DBMS 108 (FIG. 1) to provide KV store 110 (FIG. 1) to application 118 (FIG. 1) in examples of the present disclosure. Method 200, and other methods described herein, may include one or more operations, functions, or actions illustrated by one or more blocks. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation. Method 200 may start in a block 202.

In block 202, KV DBMS 108 provides the root of sub-KV stores 112 (FIG. 1) and one or more sub-KV stores 114 (FIG. 1) that form KV store 110. KV DBMS 108 assigns a distinct running transaction 116 (FIG. 1) to each store. Each sub-KV store 114 is responsible for a particular key range. Each sub-KV store 114 stores a number of key-value pairs. For example, each sub-KV store 114 may be a B+ tree having one or more leaf nodes each storing a key-value pair. The value in the key-value pair may be actual data or a pointer to the actual data.

The root of sub-KV stores 112 tracks the super-block of sub-KV stores 114. For example, the root of sub-KV stores 112 may be a B+ tree having zero or more index nodes and one or more leaf nodes where each leaf node stores information (a super-block) about a different sub-KV store. The information includes a minimum key of a sub-KV store 114, a last committed transaction for the sub-KV store (used for recovery with a journal), and a pointer to the sub-KV store (e.g., a location to the root node/block of the sub-KV store in secondary memory 106). Block 202 may be followed by block 204.

In block 204, KV DBMS 108 determines if any of sub-KV stores 114 has accumulated enough changes (e.g., a predetermined number of writes). If so, block 204 may be followed by block 206. Otherwise block 204 may be followed by block 210.

In block 206, KV DBMS 108 commits the running transaction of a particular sub-KV store 114 that has accumulated enough changes. KV DBMS 108 commits the running transaction by persisting changes made to this sub-KV store 114 during the running transaction to secondary memory 106 and updating the last committed transaction of the sub-KV store. As noted above, the last committed transaction of a sub-KV store is stored in a corresponding super-block maintained by the root of sub-KV store 112 (e.g., a leaf node of the root of sub-KV store 112) on secondary memory 106. Block 206 may be followed by block 208.

In block 208, KV DBMS 108 opens a new transaction for this particular sub-KV store 114. Blocks 206 and 208 may be repeated for each sub-KV store that has accumulated enough changes. Block 208 may be followed by block 210.

In block 210, KV DBMS 108 determines if the root of sub-KV stores 112 has accumulated enough changes. If so, block 210 may be followed by block 212. Otherwise block 210 may loop back to block 204.

In block 212, KV DBMS 108 commits the running transaction of the root of sub-KV stores 112. KV DBMS 108 commits the running transaction by persisting changes made to the root of sub-KV stores 112 during the running transaction to secondary memory 106 and updating the last committed transaction in the super-block of the root of sub-KV stores with the running transaction of the root of sub-KV stores. The super-block of the root of sub-KV store 112 carries information that allows parsing and validating of the root of sub-KV stores, including the last committed transaction, and is typically stored in a fixed location on secondary memory 106. Block 212 may be followed by block 214.

In block 214, KV DBMS 108 opens a new transaction for the root of sub-KV stores 112. Block 214 may loop back to block 204 to continue to commit the running transaction of any store that has accumulated enough changes.

The following example demonstrates method 200. Assume that sub-KV store 114-0 (FIG. 1) is responsible for the key range of [0, 9999] and has a running transaction T0, and sub-KV store 114-1 (FIG. 1) is responsible for the key range of [10000, 19999] and has a running transaction T1. Further assume that application 118 (FIG. 1) modifies 1,000 keys in the range [0, 9999] and 10 keys in the range [10000, 19999]. At this point, KV DBMS 108 (FIG. 1) determines sub-KV store 114-0 has accumulated enough changes for running transaction T0. KV DBMS 108 commits the running transaction T0 and writes the changed blocks in sub-KV store 114-0 to secondary memory 106 (FIG. 1). KV DBMS 108 updates the root of sub-KV stores 112 (FIG. 1) with new information about sub-KV store 114-0, such as the last committed transaction. However, KV DBMS 108 can hold running transaction T1 for sub-KV store 114-1 open for a longer time. This way, examples of the present disclosure avoids potential write amplification that would otherwise result from sub-KV store 114-1 writing nodes that carry small amount of changes.

Sub-KV stores 114 may have static key ranges where each sub-KV store 114 is assigned a portion of the entire key range. Typically, the key range is very large. For example, if a key is a 48-bit unsigned integer, the range of the keys would be [0, 281474976710655]. If the full key range is statistically sharded and each shard is limited to 10,000 keys, the KV store would end up with more than 28 billion shards. On another hand, the maximal number of key-value pairs that a KV store is expected to manage at any given time is typically much smaller than the number of keys in the full key range. For example, a KV store can be expected to manage maximum 16 billion keys. Creating 28 billion static shards for the full key range in such situation is impractical, as most of the sub-KV stores would be empty.

In examples of the present disclosure, KV DBMS 108 creates and deletes sub-KV stores dynamically as keys-value pairs are inserted and removed. KV DBMS 108 maintains the amount of keys in each sub-KV-store within certain limits. KV DBMS 108 creates and deletes sub-KV stores to adhere to these limits, thereby controlling the total number of shards.

Figure 3:
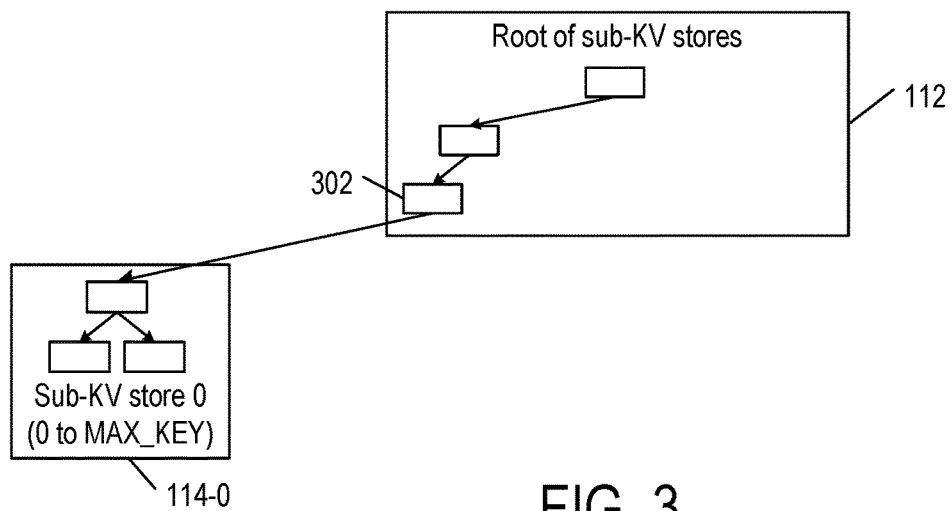
FIGS. 3 to 6 demonstrate the KV DBMS of FIG. 1 implementing dynamic key range for sub-KV stores in examples of the present disclosure.

FIGS. 3 to 6 demonstrate KV DBMS 108 (FIG. 1) implementing dynamic key range for sub-KV stores 114 (FIG. 1) in examples of the present disclosure. In FIG. 3, when KV store 110 is empty, KV DBMS 108 creates the root of sub-KV stores 112 having information (super-block) leading to an empty sub-KV store 114-0 (e.g., a leaf node 302 pointing to an empty sub-KV store 114-0), which is responsible for the entire range of keys [0, MAX_KEY] and therefore has a minimum key of 0.

Figure 4:
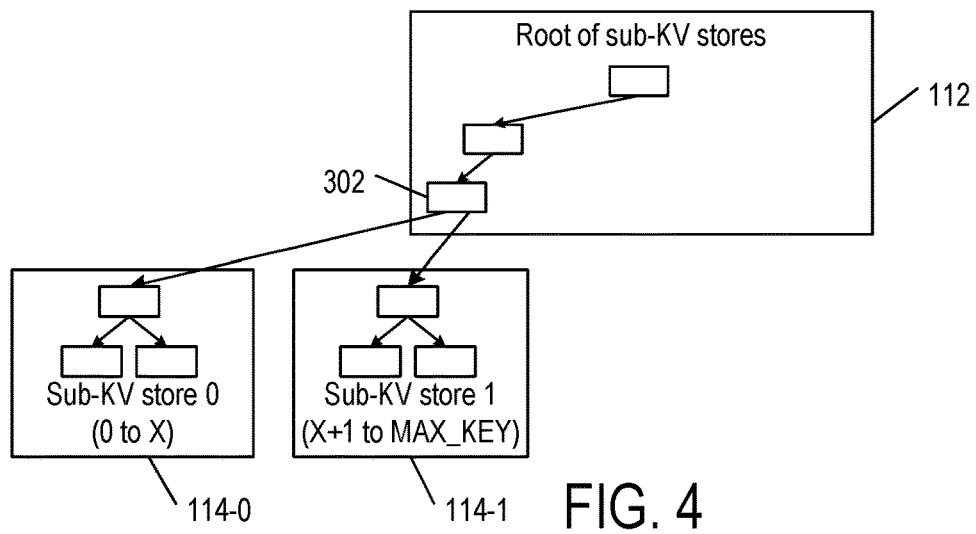

In FIG. 4, sub-KV store 114-0 reaches an upper threshold so KV DBMS 108 splits the sub-KV store 114-0 into two sub-KV stores (existing sub-KV store 114-0 and a new sub-KV store 114-1) where each has approximately half of the keys originally in sub-KV store 114-0. Thus, sub-KV store 114-0 becomes responsible for a range of keys [0, X] and has a minimum key of 0, and sub-KV store 114-1 becomes responsible for a range of keys [X+1, MAX_KEY] and has a minimum key of X+1. Note that when the root of sub-KV stores 112 is implemented as a B+ tree, one leaf node 302 may have information (super-blocks) leading to both sub-KV stores 114-0 and 114-1 or two leaf nodes may each have information (super-block) leading to one of the two sub-KV stores. In other words, a leaf in a B+ tree can carry information about several superblocks.

Figure 5:
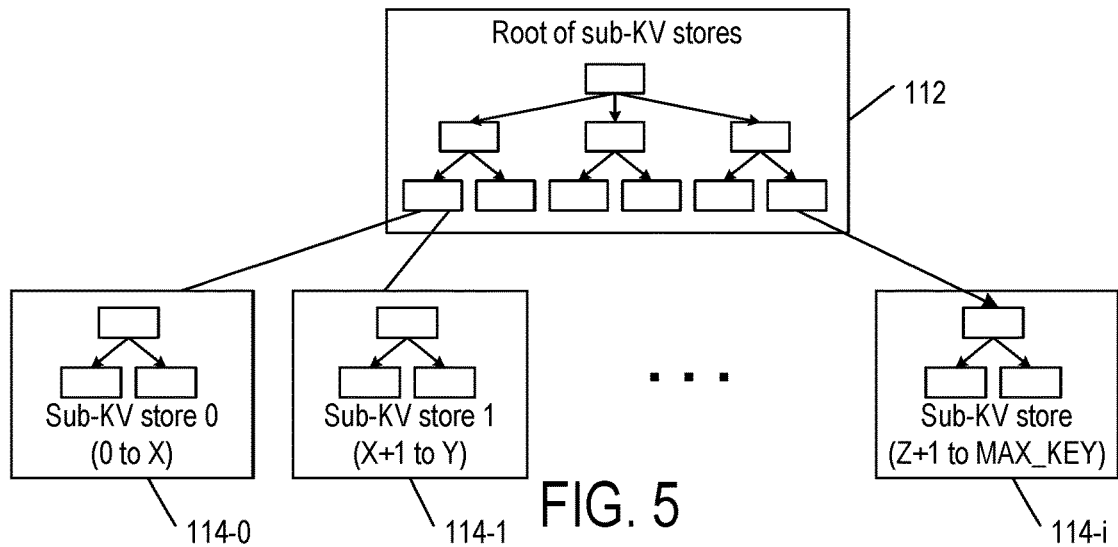

In FIG. 5, more key-value insertions cause additional sub-KV stores 114 to split. For example, sub-KV store 114-1 is split into two sub-KV stores where each has approximately half of the keys originally in sub-KV store 114-1. Sub-KV store 114-1 becomes responsible for a range of keys [X+1 to Y] but continues to have a minimum key of X+1. As new sub-KV stores are created, KV DBMS 108 updates the super-blocks in the root of sub-KV stores 112.

Figure 6:
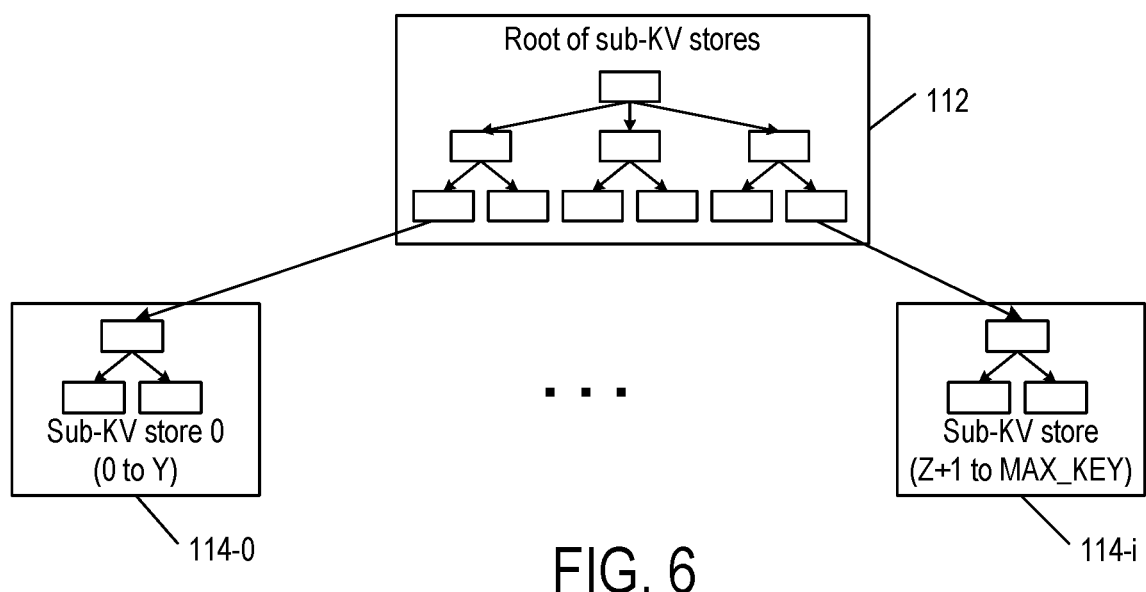

With key-value deletions, sub-KV stores 114 may have reduced numbers of keys. In FIG. 6, assume the total number of keys in a sub-KV store and its adjacent sub-KV store (right or left) are less than a lower threshold (e.g., sub-KV stores 114-0 and 114-1), KV DBMS 108 merges the two sub-KV stores by taking the key-value pairs of one sub-KV store (e.g., the right sub-KV store 114-1) and merge them into the other sub-KV store (e.g., the left sub-KV store 114-0). Sub-KV store 114-0 is now responsible for a range of keys [0 to Y] but continues to have a minimum key of 0. With constant splitting and merging, KV DBMS 108 prevents the number of sub-KV stores 114 from exceeding a defined value for a given key range. Based on the expected maximum number of key-value pairs for KV store 110, the maximal number of shards may be targeted manually by a user or automatically by KV DBMS 108. When the number of shards is close to the targeted maximum number of shards, KV DBMS 108 may merge the shards more aggressively to avoid overshooting the target number. For example, KV DBMS 108 may raise the lower thresholds to merge shards earlier.

Figure 7:
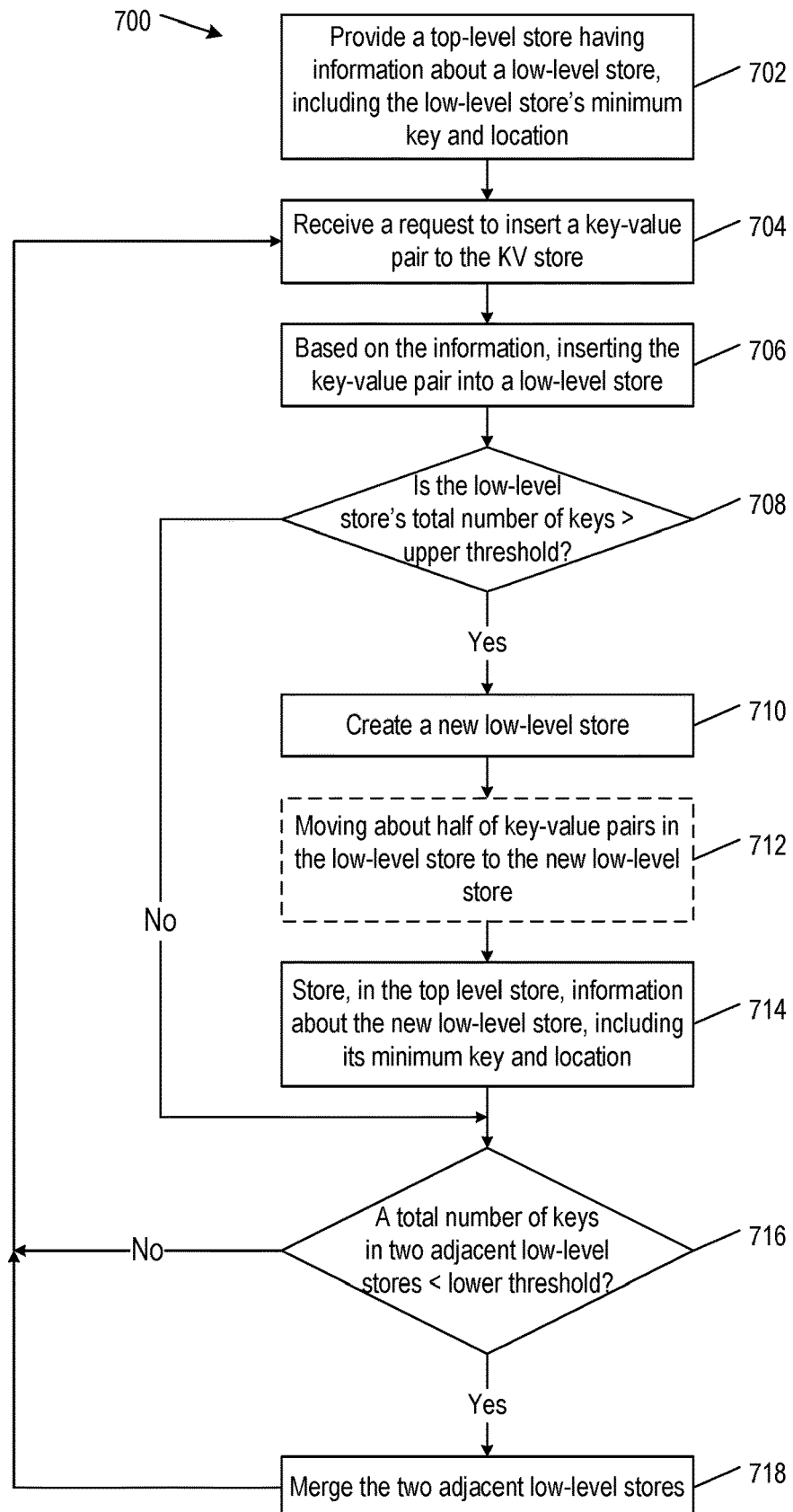
FIG. 7 is a flowchart of a method for the KV DBMS of FIG. 1 to create and delete sub-KV stores dynamically in examples of the present disclosure.

FIG. 7 is a flowchart of a method 700 for KV DBMS 108 (FIG. 1) to create and delete sub-KV stores 114 (FIG. 1) dynamically in examples of the present disclosure. Method 700 may start in a block 702.

In block 702, KV DBMS 108 provides a root of sub-KV stores 112 (FIG. 1) and a sub-KV store (e.g., sub-KV store 114-0 in FIG. 1). The root of sub-KV stores 112 has information (e.g., a super-block stored in a leaf node) that lead to sub-KV store 114-0. The information (super-block) includes a minimum key of sub-KV store 114-0, a last committed transaction for the sub-KV store, and a pointer to the sub-KV store (e.g., a location to the root node/block of the sub-KV store in secondary memory 106). Sub-KV store 114-0 is initially responsible for the entire range of keys [0, MAX_KEY] and has a minimum key of 0. Block 702 may be followed by block 704.

In block 704, KV DBMS 108 receives a request to insert a key-value pair into KV store 110 (FIG. 1). Block 704 may be followed by block 706.

In block 706, based on the information about sub-KV store(s) 114, KV DBMS 108 inserts the key-value pair into a sub-KV store 114 assigned to a range of keys including the key in the key-value pair. For example, KV DBMS 108 maintains information (e.g., a super-block) for each sub-KV store 114 in the root of sub-KV stores 112, and each super-block stores a minimum key of a sub-KV store and a pointer to the sub-KV store. When the root of sub-KV store 112 is implemented as a B+ tree, KV DBMS 108 may store the super-blocks in leaf nodes of the root of sub-KV store and create upper tree blocks in the root of sub-KV stores to track the super-blocks of each sub-KV store 114. By traversing the root of sub-KV stores 112, KV DBMS 108 finds the appropriate sub-KV store 114 to insert a key-value pair. Block 706 may be followed by block 708.

In block 708, KV DBMS 108 determines if the number of keys in the sub-KV store 114 that received the key-value insertion is greater than an upper threshold. If so, block 708 may be followed by block 710. Otherwise block 708 may be followed by block 716.

In block 710, KV DBMS 108 creates a new sub-KV store 114. Block 710 may be followed by optional block 712.

In optional block 712, KV DBMS 108 splits the sub-KV store 114 that is over the upper threshold by moving about half of its key-value pairs to the new sub-KV store 114. Optional block 712 is not used when keys increment monotonically and new key-value pairs are inserted into the newly created sub-KV store 114. Optional block 712 may be followed by block 714.

In block 714, KV DBMS 108 stores information about the new sub-KV store 114 in the root of sub-KV stores 112. For example when the root of sub-KV store 112 is implemented as a B+ tree, KV DBMS 108 creates a leaf node in the root of sub-KV stores to store a minimum key of the new sub-KV store 114, a last committed transaction for the new sub-KV store, and a pointer to the new sub-KV store. When a sub-KV store 114 is split, the minimum key for the new sub-KV store 114 would be the first key in the new sub-KV store. When monotonically incrementing keys, the minimum key for the new sub-KV store 114 would be the key following the last key in the sub-KV store 114 that exceeds the upper threshold. KV DBMS 108 also updates the upper tree nodes in the root of sub-KV stores 112, such as promoting the new sub-KV store's minimum key to a parent index node and splitting the parent node as needed. Block 714 may be followed by block 716.

In block 716, KV DBMS 108 determines if a total number of keys of two adjacent sub-KV stores 114 is less than a lower threshold. If so, block 716 may be followed by block 718. Otherwise block 716 loops back to block 704 to process any additional key-value insertion.

In block 718, KV DBMS 108 merges the two adjacent sub-KV stores 114 into one sub-KV store 114 and deletes the other sub-KV store 114. For example, KV DBMS 108 moves key-value pairs from the sub-KV store 114 on the right into the sub-KV store 114 on the left, and deletes the sub-KV store 114 on the right. When the root of sub-KV store 112 is implemented as a B+ tree, KV DBMS 108 also deletes the leaf node for the deleted sub-KV store 114 in the root of sub-KV stores and updates the upper tree nodes in the root of sub-KV stores, such as deleting the deleted sub-KV store's minimum key from a parent index node and merging the parent node with another parent node as needed. Block 718 may loop back to block 704 to process any additional key-value insert.

Figure 8:
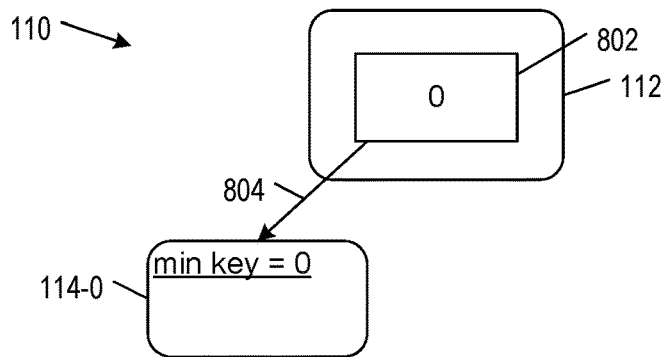
FIGS. 8 to 13 demonstrate the method of FIG. 7 in an example of the present disclosure.

FIGS. 8 to 13 demonstrate method 700 in an example of the present disclosure. Assume each sub-KV store is limited to 10 keys and each key is a 32-bit unsigned integer. In FIG. 8, KV DBMS 108 provides an empty KV store 110 having a root of sub-KV stores 112 and a sub-KV store 114-0 covering the whole key range. The root of sub-KV stores 112 has a leaf node 802 (also the root node) storing a minimum key 0 of sub-KV store 114-0 and a pointer 804 to sub-KV store 114-0. For simplicity, tree structures of sub-KV stores 114 are not illustrated.

Figure 9:
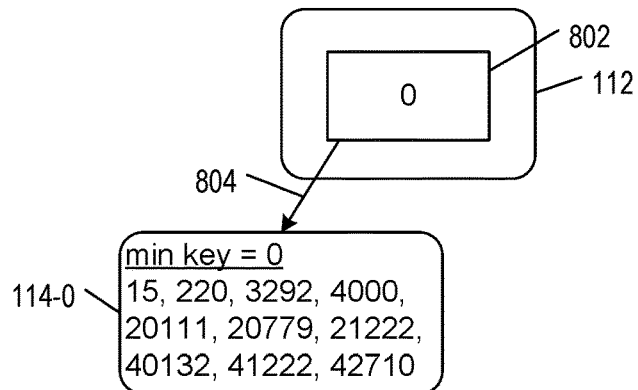
Figure 10:
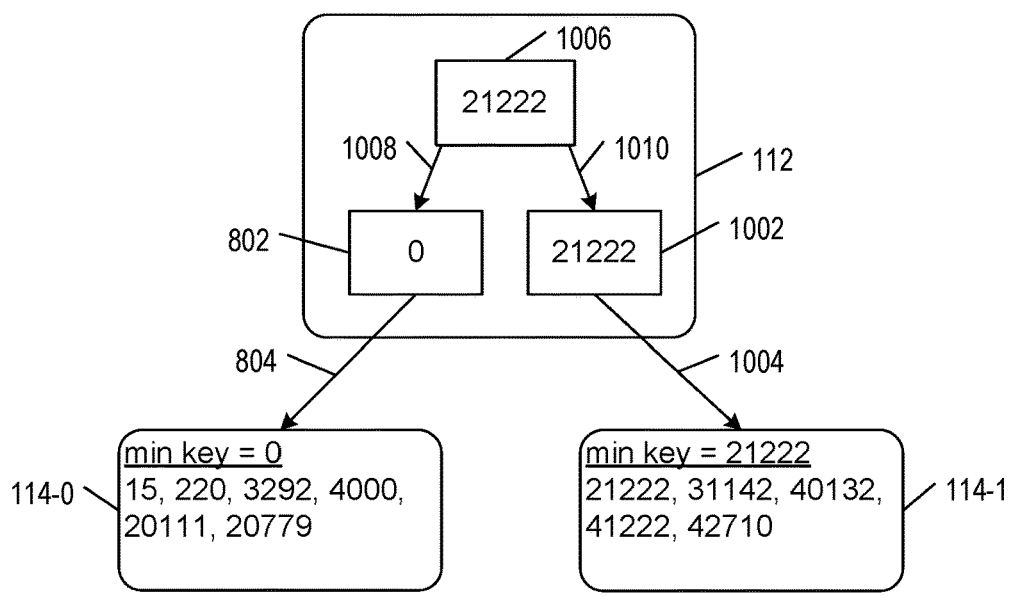

Assume the following 10 key-pair values (represented simply by their keys) are inserted into KV store 110: 20779, 15, 220, 3292, 40132, 42710, 4000, 20111, 21222, and 41222. In FIG. 9, KV DBMS 108 inserts the 10 key-value pairs into sub-KV store 114-0, which are arranged sequentially in sub-KV store 114-0.

Assume five (5) more key-value pairs (represented simply by their keys) are inserted into KV store 110 in the following order: 31142, 6469, 25000, 6754, and 33732. When key 31142 is inserted into sub-KV store 114-0, it becomes greater than the upper threshold. As a result, in FIG. 10, KV DBMS 108 splits sub-KV store 114-0 into two sub-KV stores by creating a new sub-KV store 114-1 and moving about half of the key-value pairs in sub-KV store 114-0 into the new sub-KV store 114-1. Specifically, KV DBMS 108 moves 21222, 31142, 40132, 41222, and 42710 to the new sub-KV store 114-1. KV DBMS 108 also updates the root of sub-KV stores 112 by creating a new leaf node 1002 that stores a minimum key 21222 of sub-KV store 114-1 and a pointer 1004 to sub-KV store 114-1. KV DBMS 108 may also create an index node 1006 (also the root node) storing, the minimum key 21222, a pointer 1008 to sub-KV store 114-0 for keys greater or equal to 0 and less than the minimum key 21222, and a pointer 1010 to sub-KV store 114-1 for keys equal to or greater than the minimum key 21222. In index node 1006, the minimum key 21222 is stored to the right of pointer 1008, and pointer 1010 is stored to the right of minimum key 21222.

Figure 11:
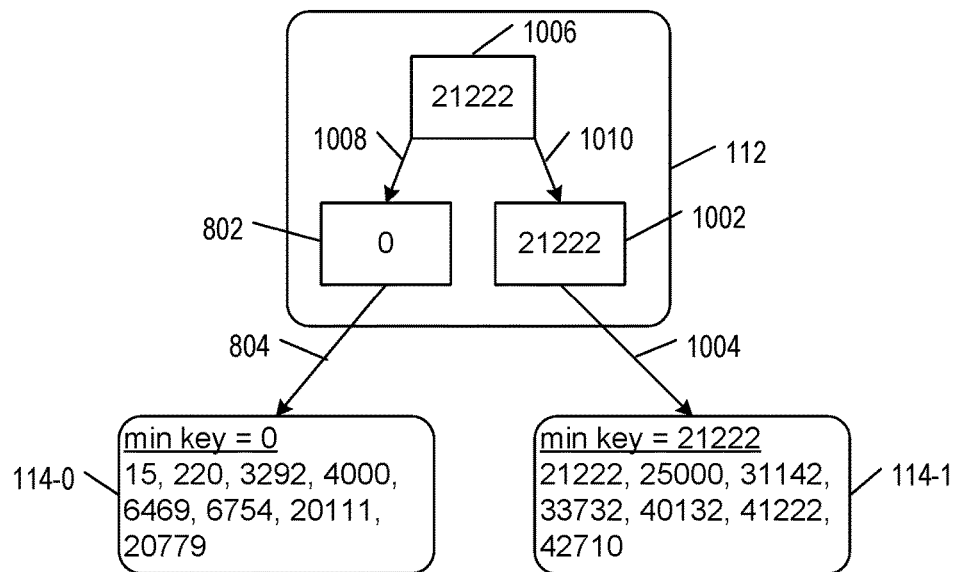
Figure 12:
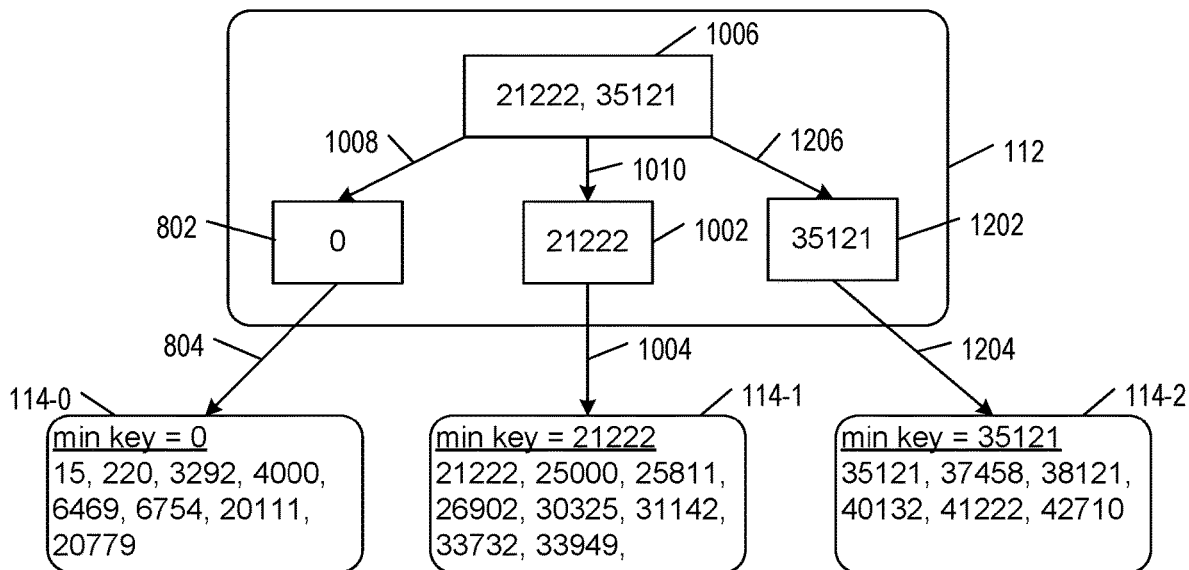

In FIG. 11, KV DBMS 108 continues to insert the remaining four (4) keys with keys 6469 and 6754 inserted into sub-KV store 114-0, and keys 25000 and 33732 inserted into sub-KV store 114-1.

Assume seven (7) more key-value pairs (represented simply by their keys) are inserted into KV store 110 in the following order: 25811, 26902, 37458, 35121, 38121, 33949, and 30325. When keys 25811, 26902, 37458, 35121 are inserted into sub-KV store 114-1, it becomes greater than the upper threshold (10). As a result, in FIG. 12, KV DBMS 108 splits sub-KV store 114-1 into two sub-KV stores by creating a new sub-KV store 114-2 and moving about half of the key-value pairs in sub-KV store 114-1 to new sub-KV store 114-2. Specifically, KV DBMS 108 moves keys 35121, 37458, 40132, 41222, and 42170 to new sub-KV store 114-2. KV DBMS 108 also updates the root of sub-KV stores 112 by creating a new leaf node 1202 that stores a minimum key 35121 of sub-KV store 114-2 and a pointer 1204 to sub-KV store 114-2. KV DBMS 108 may also update index node 1006 by adding the minimum key 35121 and a pointer 1206 to sub-KV store 114-2 for keys equal to or greater than the minimum key 35121. Note that pointer 1010 now direct keys that are equal to or greater than the minimum key 21222 but less than the minimum key 35121. In index node 1006, the minimum key 35121 is stored to the right of pointer 1010, and pointer 1206 may be stored on the right of the minimum key 35121.

Figure 13:
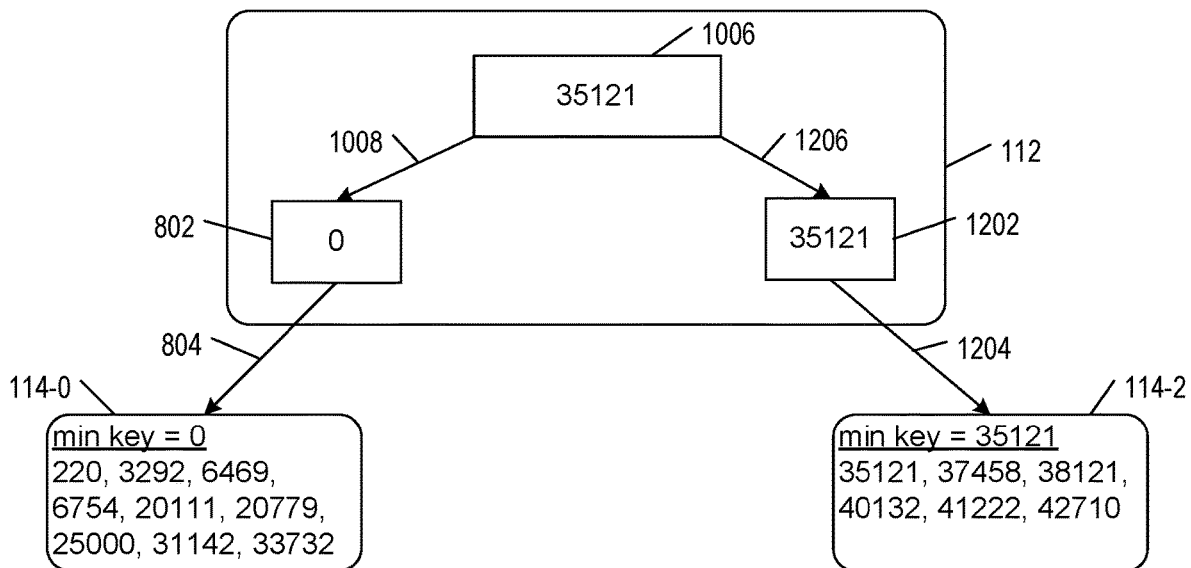

Now assume seven (7) key-value pairs (represented simply by their keys) are deleted: 30325, 26902, 15, 4000, 25811, 33949, and 21222. When these keys are deleted, the total number of keys in sub-KV stores 114-0 and 114-1 become less than a lower threshold (e.g., 10 keys). In FIG. 13, KV DBMS 108 merges sub-KV stores 114-0 and 114-1 by moving keys 25000, 31142, and 33732 from sub-KV store 114-1 into sub-KV store 114-0. KV DBMS 108 also updates the root of sub-KV stores 112 by deleting leaf node 1002, and the minimum key 21222 and pointer 1010 from index node 1006. In index node 1006, the minimum key 35121 is stored to the right of pointer 1008, and pointer 1206 is stored to the right of minimum key 35121.

Figure 14:
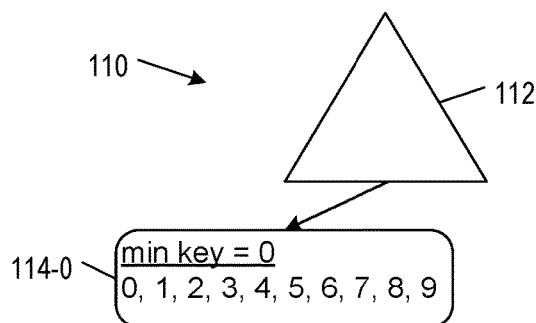
FIGS. 14 to 16 demonstrate the method of FIG. 7 in another example of the present disclosure.
Figure 15:
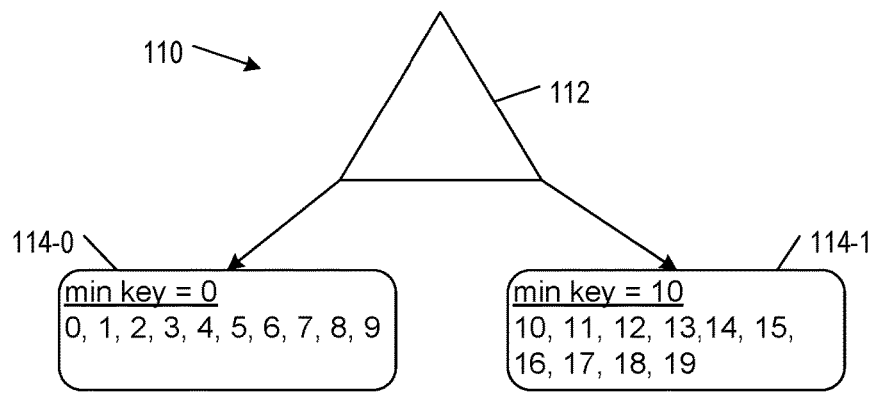
Figure 16:
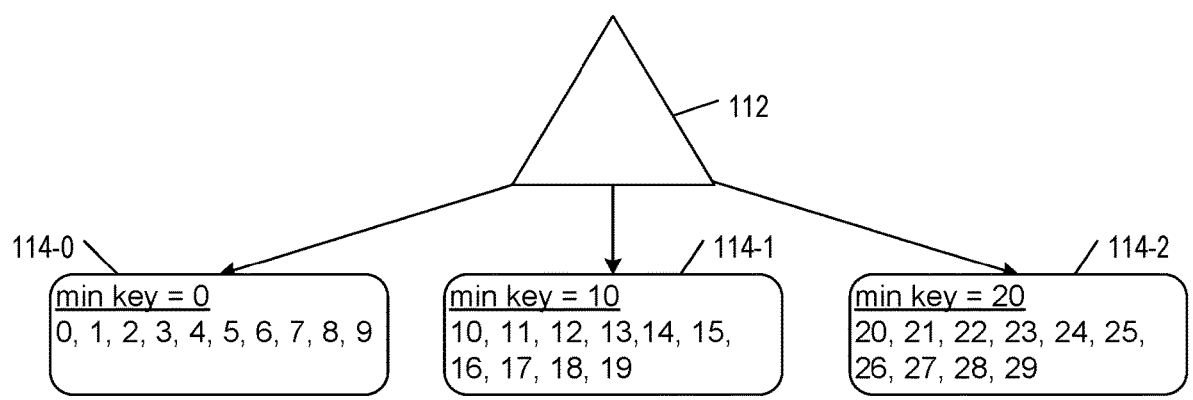

FIGS. 14 to 16 demonstrate method 700 in an example of the present disclosure where keys monotonically increment. Assume each sub-KV store is limited to 10 keys and each key is a 32-bit unsigned integer. In FIG. 14, KV DBMS 108 provides a KV store 110 having a root of sub-KV stores 112 and a sub-KV store 114-0 covering the whole key range. For simplicity, tree structures of the root of sub-KV stores 112 and sub-KV stores 114 are not illustrated.

Assume 10 key-pair values (represented simply by their keys 0 to 9) are inserted into KV store 110. KV DBMS 108 inserts the 10 key-value pairs into sub-KV store 114-0, which are arranged sequentially in sub-KV store 114-0.

Assume 10 more key-pair values (represented simply by their keys 10 to 19) are inserted into KV store 110. In FIG. 15, KV DBMS 108 creates a new sub-KV store 114-1 and inserts the additional 10 key-value pairs into sub-KV store 114-1, which are arranged sequentially in sub-KV store 114-1.

Assume 10 more key-pair values (represented simply by their keys 20 to 29) are inserted into KV store 110. In FIG. 16, KV DBMS 108 creates a new sub-KV store 114-2 and inserts the additional 10 key-value pairs into sub-KV store 114-2, which are arranged sequentially in sub-KV store 114-2.

It is assumed that there is no particular order in which key-value pairs are removed from KV store 110 even though they were inserted with monotonically incrementing keys. Therefore, the merging of sub-KV stores 114 would occur as described in the preceding example.

Various other adaptations and combinations of features of the embodiments disclosed are within the scope of the invention. Numerous embodiments are encompassed by the following claims.

The invention claimed is:

1. A computer implemented method for a key-value (KV) store database management system (DBMS) to provide a KV store to an application, comprising:
   using a hardware processor executing program instructions for:
   maintaining a two-layer hierarchical structure including a top level store in a top layer and at least one low-level store in a bottom layer, wherein the top level store stores a minimum key and a pointer to a storage location of each respective low-level store of the at least one low-level store, said top level store does not store key-value pairs, and dynamically changes according to a change in a number of low level stores, and
   wherein said top level store stores a minimum key and a pointer to a storage location of a first low-level store, and wherein said top level store further stores a respective minimum key and a respective pointer to a storage location of each of further low-level stores;
   receiving a request to insert a key-value pair into the KV store;
   based on the minimum key and the pointer of said first low-level store, inserting the key-value pair into the first low-level store;
   after said inserting of the key-value pair into the first low-level store, determining if a number of key-value pairs stored in said first low-level store is above an upper threshold;
   when the number of key-value pairs stored in said first low-level store is above said upper threshold:
   creating a second low-level store in the two-layer hierarchical structure; and
   storing, in the top level store, a second minimum key and a second pointer to storage location of said second low-level store, without storing key-value pair in said top level store;
   wherein following a reception of a next request for inserting a next key-value pair into said KV store, said next key-value pair is inserted into said second low-level store.

2. The computer implemented method of claim 1, wherein said hardware processor further executing program instructions for, when the first low-level store's number of keys is over the upper threshold, moving about half of the key-value pairs in the first low-level store to the second low-level store.

3. The computer implemented method of claim 1, wherein said hardware processor further executing program instructions for:
   receiving requests to insert new key-value pairs to the KV stores in the second low-level store, the new key-value pairs comprising monotonically increasing keys; and
   storing the new key-value pairs in the second low-level store.

4. The computer implemented method of claim 1, wherein said hardware processor further executing program instructions for:
   determining if a total number of keys in the first low-level store and the second low-level store is less than a lower threshold from key-value deletions; and
   when the total number of keys in the first low-level store and the second low-level store is less than the lower threshold, merging the first and the second low-level stores.

5. The computer implemented method of claim 4, wherein said merging comprises moving key-value pairs from the second low-level store to the first low-level store and deleting the second minimum key and the second pointer from the top-level store.

6. The computer implemented method of claim 1, wherein a first leaf node of the top level store includes the first and the second minimum keys, and the first and second pointers.

7. The computer implemented method of claim 1, wherein:
   a first leaf node of the top level store includes the first minimum key and the first pointer;
   a second leaf node of the top level store includes the second minimum key and the second pointer; and
   the method further comprises creating a parent node for the first and the second leaf nodes of the top level store.

8. The computer implemented method of claim 1, wherein maintaining the two-layer hierarchical structure comprises:
   accumulating a running transaction for the top level store;
   committing the running transaction for the top level store;
   accumulating a running transaction for the first low-level store; and
   committing the running transaction for the first low-level store, wherein committing of the running transaction for the first low-level store occurs independently from committing of the running transaction for the top level store.

9. The computer implemented method of claim 5, wherein said merging further comprises deleting from the top level store the minimum key value and the storage location of said second low-level store.

10. The computer implemented method of claim 1, wherein said hierarchical structure is selected from a group consisting of: B-tree, red-black tree, AVL tree and skip-list structure.

11. A database system, comprising:
   a persistent memory medium which stores a KV store, said KV store comprising:

at least one low-level KV store including a first low-level KV store; and
a top-level KV store;
wherein said top-level KV store stores a respective minimum key and a respective pointer to a storage location of each respective low-level KV store of the at least one low-level KV store, said top level store does not store key-value pairs, and dynamically changes according to a change in a number of low level KV stores; and
wherein said top-level KV store stores a minimum key and a pointer to a storage location of said first low-level KV store; and
a hardware processor executing program instructions stored in a main memory, implementing, when executed by said hardware processor, a KV store database management system (DBMS) configured to:
receive a request to insert a key-value pair to the KV store;
based on the minimum key and the pointer of said first low- level store, insert the key-value pair into the first low-level KV store;
when the first low-level KV store's number of keys is over an upper threshold:
create a second low-level KV store; and
store, in the top level KV store, a second minimum key and a second pointer to storage location of said second low-level KV store, without storing key-value pair in said top level KV store;
wherein following a reception of a next request for inserting a next key-value pair into said KV store, said next key-value pair is inserted into said second low-level KV store.

12. The system of claim 11, wherein the KV store DBMS is further configured to, when the first low-level KV store's number of keys is over the upper threshold, moving about half of the key-value pairs in the first low-level KV store to the second low-level KV store.

13. The system of claim 11, wherein the KV store DBMS is further configured to:
receive requests to insert new key-value pairs to the KV stores in the second low-level KV store, the new key-value pairs comprising monotonically increasing keys; and
store the new key-value pairs in the second low-level KV store.

14. The system of claim 11, wherein the KV store DBMS is further configured to:
determine if a total number of keys in the first low-level KV store and the second low-level KV store is less than a lower threshold from key-value deletions; and
when the total number of keys in the first low-level KV store and the second low-level KV store is less than the lower threshold, merge the first and the second low-level KV stores.

15. The system of claim 14, wherein said merge comprises moving key-value pairs from the second low-level KV store to the first low-level KV store and deleting the second minimum key and the second pointer from the top-level KV store.

16. The system of claim 11, wherein a first leaf node of the top level KV store includes the first and the second minimum keys and the first and second pointers.

17. The system of claim 11, wherein:
a first leaf node of the top level KV store includes the first minimum key and the first pointer;
a second leaf node of the top level KV store includes the second minimum key and the second pointer; and
the method further comprises creating a parent node for the first and the second leaf nodes of the top level KV store.

18. The system of claim 11, wherein the KV store DBMS is further configured to:
accumulate a running transaction for the top level KV store;
commit the running transaction for the top level KV store;
accumulate a running transaction for the first low-level KV store; and
commit the running transaction for the first low-level KV store, wherein committing of the running transaction for the first low-level KV store occurs independently from committing of the running transaction for the top level KV store.

19. The system of claim 15, wherein said merging further comprises deleting from the top level KV store the minimum key value and the storage location of said second low-level KV store.

20. The system of claim 11, wherein said hierarchical structure is selected from a group consisting of: B-tree, red-black tree, AVL tree and skip-list structure.

21. A non-transitory, computer-readable storage medium encoded with instructions executable by a processor to implement a key-value (KV) store database management system (DBMS) to provide a KV store to an application, the instructions comprising:
maintain a two-layer hierarchical structure including a top level store and at least one low-level which includes a first low-level store,
wherein -the top level store stores a minimum key and a pointer to a storage location of each respective low-level store of the at least one low-level store, said top level store does not store key-value pairs, and dynamically changes according to a change in a number of low level stores, and
wherein said top level store stores a minimum key and a pointer to storage location of the first low-level store, and wherein said top level store further stores a respective minimum key and a respective pointer to a storage location of each of further low-level stores;
receive a request to insert a key-value pair to the KV store;
based on the minimum key and the pointer of the first low-level KV store, insert the key-value pair into the first low-level store;
after said inserting the key-value pair into the first low-level store, determine if the first low-level store's number of keys is over an upper threshold;
when the first low-level store's number of keys is over said upper threshold:
create a second low-level store in the two-layer hierarchical structure; and
store, in the top level store, a second minimum key and a second pointer to storage location of said second low-level store, without storing key-value pair in said top level store;
wherein following a reception of a next request for inserting a next key-value pair into said KV store, said next key-value pair is inserted into said second low-level store.

22. The storage medium of claim 21, wherein the instructions further comprise, when the first low-level store's number of keys is over the upper threshold, move about half of the key-value pairs in the first low-level store to the second low-level store.

23. The storage medium of claim 21, wherein the instructions further comprise:
receive requests to insert new key-value pairs to the KV stores in the second low-level store, the new key-value pairs comprising monotonically increasing keys; and
store the new key-value pairs in the second low-level store.

24. The storage medium of claim 21, wherein the instructions further comprise:
determine if a total number of keys in the first low-level store and the second low-level store is less than a lower threshold from key-value deletions; and
when the total number of keys in the first low-level store and the second low-level store is less than the lower threshold, merge the first and the second low-level stores.

25. The storage medium of claim 21, wherein a first leaf node of the top level store includes the first and the second minimum keys and the first and second pointers.

26. The storage medium of claim 21, wherein:
a first leaf node of the top level store includes the first minimum key and the first pointer;
a second leaf node of the top level store includes the second minimum key and the second pointer; and
the method further comprises creating a parent node for the first and the second leaf nodes of the top level store.

27. The storage media of claim 21, wherein maintain the two-layer hierarchical structure comprises:
accumulate a running transaction for the top level store;
determine when to commit the running transaction for the top level store;
accumulate a running transaction for the first low-level store; and
determine when to commit the running transaction for the first low-level store, wherein committing of the running transaction for the first low-level store occurs independently from committing of the running transaction for the top level store.

28. The storage medium of claim 21, wherein said hierarchical structure is selected from a group consisting of: B-tree, red-black tree, AVL tree and skip-list structure.

* * * * *